April 16, 1963  E. GUENTHER  3,085,440
FLUID-ACTUATED TOROIDAL-RING VALVE
Filed April 7, 1960  6 Sheets-Sheet 1

INVENTOR.
EMMERICH GUENTHER
BY Hudson & Young
ATTORNEYS

April 16, 1963 E. GUENTHER 3,085,440
FLUID-ACTUATED TOROIDAL-RING VALVE
Filed April 7, 1960 6 Sheets-Sheet 2

INVENTOR.
EMMERICH GUENTHER

BY Hudson & Young

ATTORNEYS

INVENTOR.
EMMERICH GUENTHER

BY Hudson & Young

ATTORNEYS

April 16, 1963 E. GUENTHER 3,085,440
FLUID-ACTUATED TOROIDAL-RING VALVE
Filed April 7, 1960 6 Sheets-Sheet 4

INVENTOR.
EMMERICH GUENTHER
BY Hudson & Young
ATTORNEYS

April 16, 1963      E. GUENTHER      3,085,440
FLUID-ACTUATED TOROIDAL-RING VALVE Filed April 7, 1960      6 Sheets-Sheet 6

INVENTOR.
EMMERICH GUENTHER

BY
*Hudson & Young*

ATTORNEYS

United States Patent Office 3,085,440
Patented Apr. 16, 1963

3,085,440
FLUID-ACTUATED TOROIDAL-RING VALVE
Emmerich Guenther, Bartlesville, Okla., assignor to Phillips Petroleum Company, a corporation of Delaware
Filed Apr. 7, 1960, Ser. No. 20,765
12 Claims. (Cl. 73—421.5)

This invention relates to a valve mechanism. In one aspect it relates to a fluid-actuated, toroidal-ring valve. In still another aspect this invention relates to a fluid-actuated toroidal-ring sealed sampling valve for periodically supplying slugs of sample gas to the sorption columns of a chromatographic analyzer.

Gas chromatography is a known method of analyzing fluid samples by preferential sorption and desorption. In sorption chromatography, a column containing appropriate sorbent, usually in granular form, is used to separate the various components of a fluid sample.

Conventionally, as the segregated constituents emerge from the sorbent-packed columns, they are suitably detected through the sensing of a characteristic property, such as thermal conductivity, density, refractive index, infrared adsorption, and the like, which detect the presence of the several compounds and measure the relative amounts thereof.

The desirability of using chromatography for such specific uses as fractionation (multi-stage distillation) control has been recognized for some time. Certain features of process chromatography, such as specific measurement, high sensitivity and simplicity of operation makes this type of analyzer very attractive for use in automatic process control. There are, however, some apparently inherent features of chromatography which have appeared to be obstacles in adapting chromatography to wide-spread use in process control. The first of these features is the fact that the chromatographic analysis time is long. Ordinarily, analysis time cycles range from 10 to 30 minutes, which may be acceptable for some purposes, but are often inadequate for close control of a process operation.

Another problem in high-speed chromatography is the manner of periodically directing a sample slug to a chromatographic analyzer with as little control mechanism as is possible. This is desired in order to increase the reliability of operation and achieve minimal volume between process stream being sampled and controlled, and the sensing device, thereby reducing the analysis time cycle to that required for close control of a process operation. Presently used sampling valves are actuated by motor shafts that require careful sealing and packing to avoid even the slight leaks from the valve chambers that would destroy the usefulness of such valves in high speed chromatography. Coincident with these older types of sample valve control are added space requirements, which are undesirable from the point of view of the analysis time cycle, as noted previously.

The present invention employs a flexible toroidal ring to open and close the passages between adjacent members of a plurality of ports in a sampling valve by means of ganged pistons. These pistons are controlled by a power gas pressure against selected areas of an actuating diaphragm adjacent to the pistons. The valve of this invention is designed to permit a power gas pressure of about 20 p.s.i.g. to control the flow of a carrier gas, at a pressure as high as 150 p.s.i.g., through the sampling valve of a chromatographic analyzer.

It is, therefore, an object of this invention to provide a sampling valve for use in a chromatographic analyzer, whereby the analysis time cycle can be reduced.

It is also an object to provide a fast response, small internal volume, fluid-actuated, piston-controlled, toroidal ring valve for supplying sample slugs to the columns of a chromatographic analyzer.

It is another object to provide a valve which can withstand operation at high temperatures and under corrosive conditions.

It is a still further object to provide a sampling valve in which a low-pressure power gas can control the flow therethrough of a carrier gas that is at a relatively higher pressure.

Further objects and advantages of this invention will become apparent to those skilled in the art from a study of the accompanying disclosure, appended claims and drawings in which:

Figure 1:
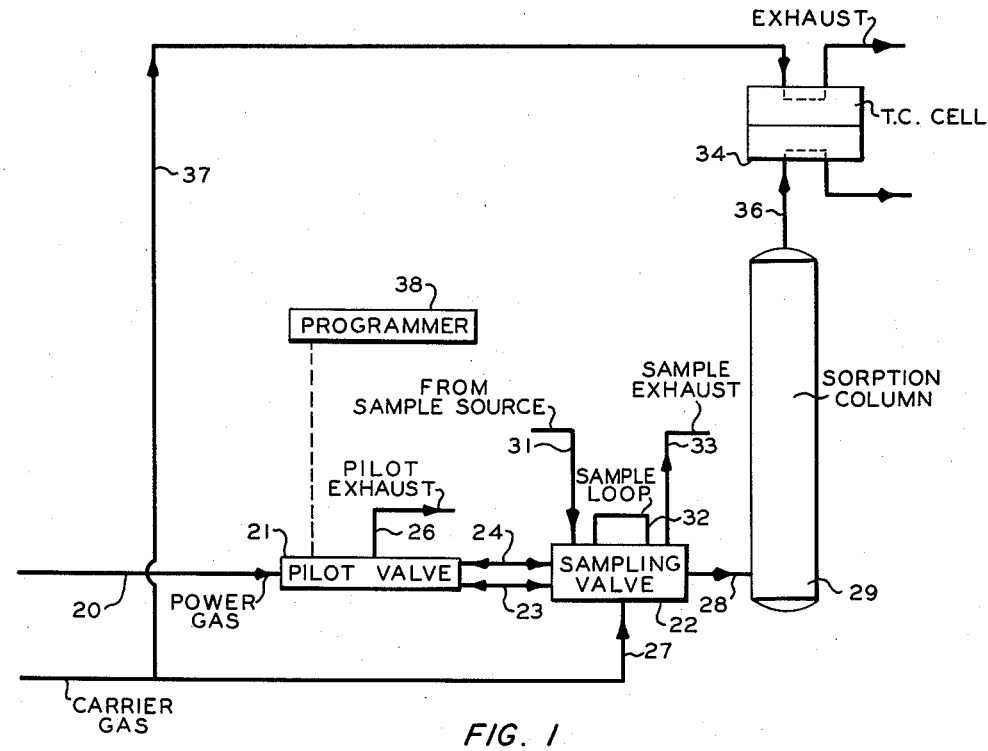
FIGURE 1 is a simplified flow sheet of a chromatographic analyzer system in which the valve of this invention is used as the sampling valve.

Reference is now made to the drawing in detail, wherein like parts have been designated by like reference numerals, and to FIGURE 1 in particular, wherein a power gas, such as air, passes via conduit 20 to pilot valve 21 from which the gas stream is directed to a first inlet of a fluid-actuated sampling valve 22 via conduit 23. Meanwhile, the second side of sampling valve 22 is being vented via conduit 24, pilot valve 21, and pilot exhaust conduit 26. A carrier gas, such as helium or hydrogen, is passed via conduit 27 to sampling valve 22, then through conduit 28 to sorption column 29. A gaseous sample from the process stream, introduced to sampling valve 22 via conduit 31 is being circulated through the sample loop 32 of sampling valve 22 and then is vented via sample exhaust conduit 33. Periodically, as desired, the sample is passed along by the carrier gas, via conduit 28, to sorption column 29, where constituents of the sample to be identified and measured, are absorbed or adsorbed, depending upon the nature of the contact material. These constituents are then selectively desorbed by a continuing flow of carrier gas through column 29.

The sorption column effluent passes through an analyzer, indicated as thermal conductivity cell assembly 34, via conduit 36. The output signal from assembly 34 is passed to a recording instrument (not shown), which can be a conventional strip chart recorder. A stream of carrier gas is passed via conduit 37 from conduit 27 directly to the reference side of detector 34, so as to balance out the effect of the carrier gas in the column 29 effluent. The sample gas to be analyzed generally enters continuously through conduit 31, and this gas, even when a slug thereof is selected for analysis, is exhausted from sampling valve 22 via exhaust conduit 33. Pilot valve 21 is actuated by programmer 38, which can be operated by a time cycle or other means. For a more detailed discussion of the design and manner of operation of a typical pilot valve to be used in conjunction with this invention, see the copending application of Emmerich Guenther, Serial No. 858,997, filed December 11, 1959.

When pilot valve 21 is changed from the first described position, power gas is now directed to the second side of sampling valve 22 via conduit 24. The carrier gas now passes to sample loop 32, collecting the sample trapped therein, and carrying the same to column 29, via conduit 28. Meanwhile, the first side of sampling valve 22 is vented via conduit 23, pilot valve 21, and pilot exhaust conduit 26. Thus, each time pilot valve 21 is switched to the alternate position, a measured sample is passed via conduit 28 to column 29 for sorption and desorption therein.

Figure 2:
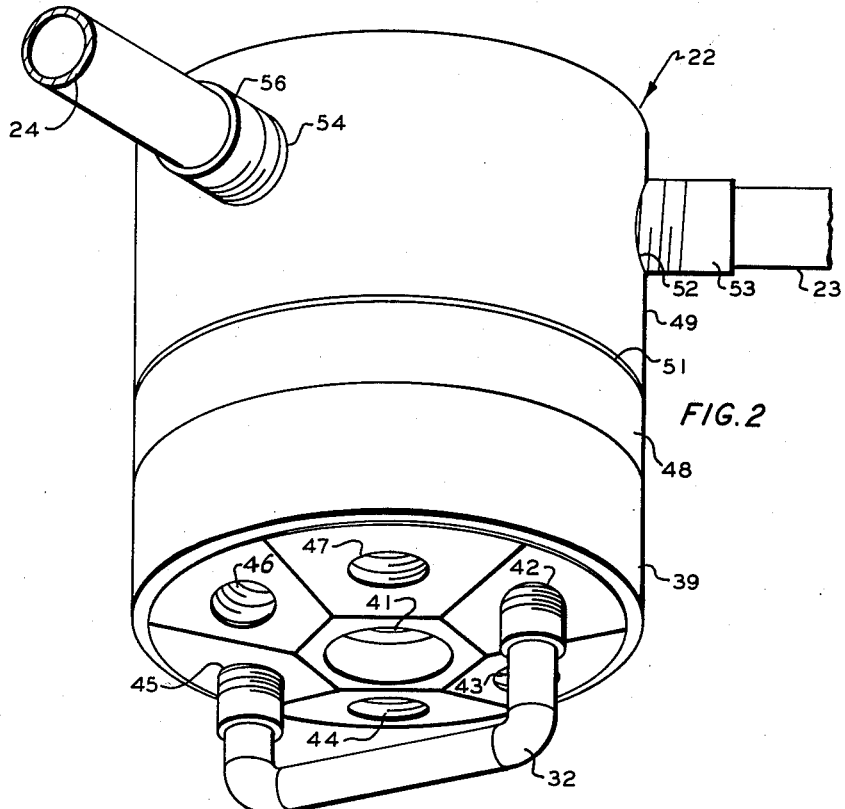
FIGURE 2 is a perspective view of an assembled, fluid-actuated, piston-controlled, toroidal-ring valve of this invention.

In FIGURE 2, there is shown a perspective view of the assembled fluid-actuated sampling valve, generally designated 22, of this invention. Sampling valve 22 comprises a lower first block 39 having a centrally disposed, generally cylindrical, vertical chamber 41 therein. Block 39 is further provided with a set of six vertical passages 42 through 47, disposed circumferentially about central chamber 41. The vertical passages 42 through 47 communicate between the upper and lower surfaces of lower block 39. Sample loop 32 of FIGURE 1 externally communicates between vertical passages 42 and 45. A middle block 48 is disposed adjacent to lower block 39 and is provided with six spaced vertical chambers (not shown).

An upper block 49 is spaced from middle block 48 by a flexible diaphragm 51. Diaphragm 51 is preferably composed of an elastomer, such as silicone rubber, which can withstand relatively high operating temperatures. Block 49 is also provided with a generally horizontal threaded passage 52 extending between the region external to block 49 and a central chamber therein (not shown). Passage 52 is provided with a threadedly mounted inlet nut 53, adapted to receive tubing 23 therein, from pilot valve 21. Block 49 is further provided with a second generally horizontal threaded passage 54 extending between said region external to block 49 and said central chamber (not shown). Passage 54 is provided with a threadedly mounted inlet nut 56, which is adapted to receive tubing 24 therein, from pilot valve 21.

Figure 3:
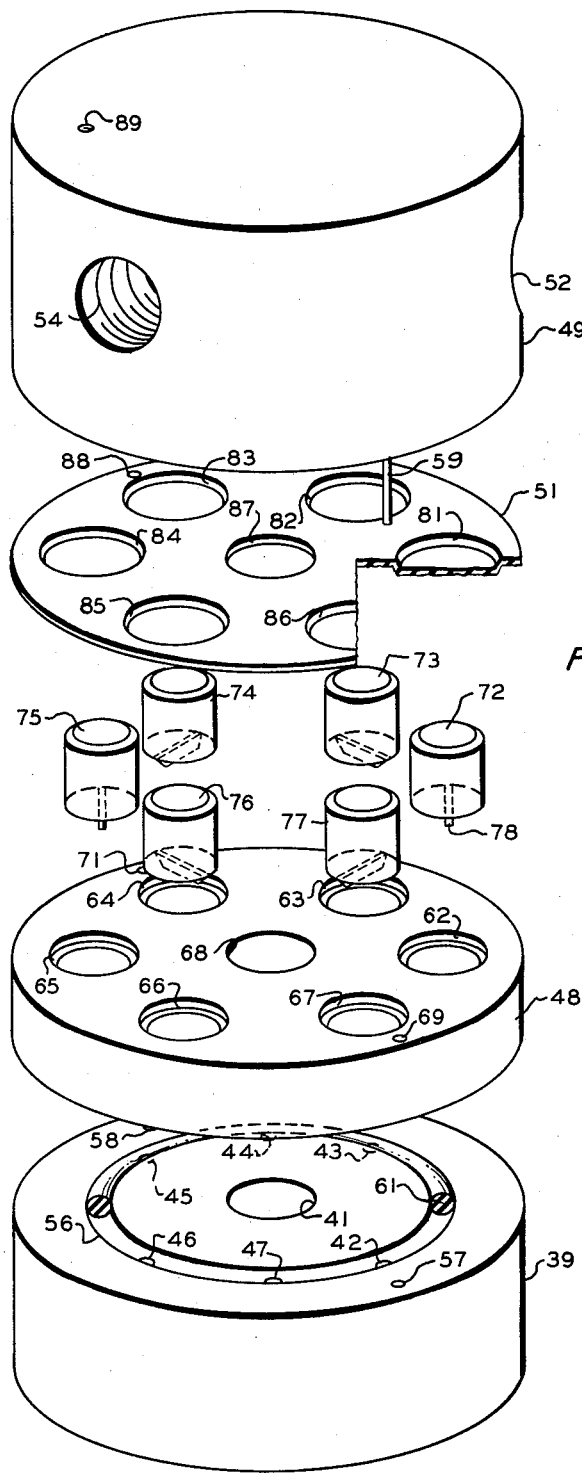
FIGURE 3 is an exploded perspective view of the components of the sampling valve of this invention arranged in the order of their assembly.

Referring now to FIGURE 3, in lower block 39, is found central, generally cylindrical vertical chamber 41 which communicates between the upper and lower surface thereof. The upper surface of block 39 is provided with an annular channel 56 disposed about central chamber 41. The upper terminals of passages 42 to 47 terminate in the bottom of channel 56. Block 39 is also provided with a pair of spaced perforations 57 and 58, which are adapted to receive therein the free end of a pair of pins, such as 59, which are secured to the lower surface of block 49. A resilient, toroidal ring 61 is disposed in channel 56 and adapted to frictionally engage the sides of said channel. Toroidal ring 61 is composed of a resilient plastic which is high temperature-resistant and does not absorb gases. Viton "A" is a preferred plastic (a copolymer of hexafluoropropylene and vinylidene fluoride) in this application.

Middle block 48 adjacent to lower block 39, is provided with said six vertical spaced chambers 62 to 67, communicating between the upper and lower sides thereof. Each of said chambers is provided with a counter bore in the upper end thereof. A central passage 68 is provided in block 48 for receiving therethrough a fastening bolt, such as an Allen screw (not shown). Two perforations, 69 and 71, are provided near the periphery of block 48 and disposed so that when block 48 is mounted on pins 59 of upper block 49, the centers of chambers 62 to 67 are midway between each adjacent pair of said upper terminals of the six passages 42 to 47 in lower block 39.

A set of six pistons, 72 to 77, are disposed in chambers 62 to 67 of block 48, respectively. Each of said pistons is provided with a diametrically aligned lug on the lower end thereof, such as lug 78 on piston 72, which lugs are adjacent to toroidal ring 61.

Thin flexible diaphragm 51 is disposed between the upper face of middle block 48 and the lower face of upper block 49. With many cycles of operation of sampling valve 22, circular depressions, 81 to 86, form in diaphragm 51, adjacent to the upper ends of pistons 72 to 77, respectively. Diaphragm 51 is further provided with a central perforation 87 for receiving therethrough the shaft of said Allen screw. A pair of spaced perforations, such as 88, are provided near the periphery of diaphragm 51 for receiving therethrough pins 59 of upper block 49.

Upper block 49 has said pair of spaced pins, such as 59, affixed to the lower horizontal face of said block and near the periphery thereof. Pins 59 are of sufficient length to penetrate the adjacent perforations in diaphragm 51, middle block 48, and terminate within lower block 39. Upper block 49 is further provided with a threaded vertical passage 89, adapted to receive therein an adjusting screw (not shown). The lower end of said adjusting screw terminates adjacent the center of depression 84 in flexible diaphragm 51. This adjustment permits the regulation of the flow rate of the carrier gas into sampling valve 22.

Figure 4:
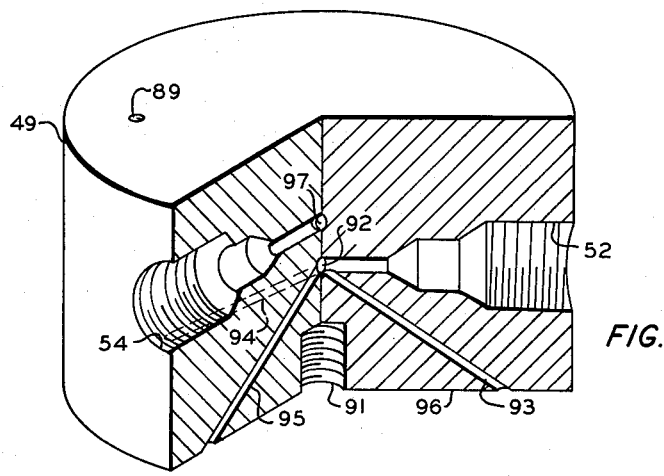
FIGURE 4 is a perspective view in partial section of the upper cylindrical block of this valve.

In FIGURE 4, showing upper block 49 in partial section, is found a generally cylindrical, threaded vertical chamber 91 which communicates between the lower surface thereof and a point intermediate the upper and lower surfaces of block 49. Chamber 91 is threaded to receive the threaded end of said Allen screw. Passage 52, which is counter bored, counter sunk, and threaded to receive inlet nut 53 (not shown), extends from a region exterior of block 49 to a first point 92 on the vertical center line of block 49. Inclined passages, 93, 94 and 95, extend from juncture point 92 to the lower face 96 of block 49. The lower ends of these inclined passages terminate adjacent to flexible diaphragm 51 at points above piston 72, 74 and 76, respectively. Another horizontal passage 54, which is counter bored, counter sunk, and threaded to receive inlet nut 56 (not shown), extends from the said region exterior of block 49 to a second point 97 on the center line of said block.

Figure 5:
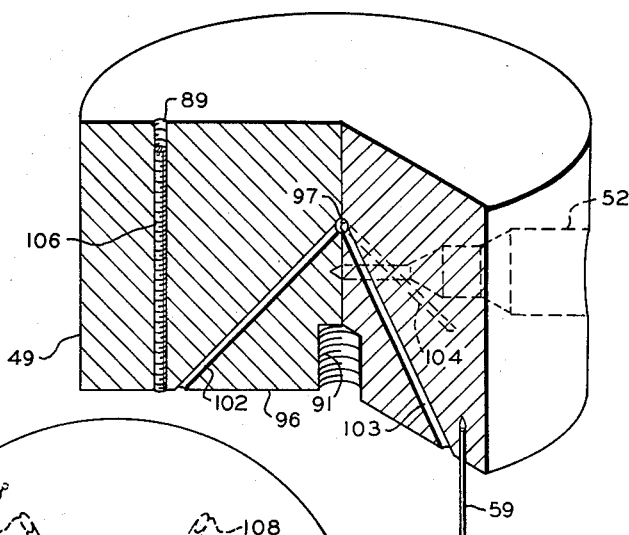
FIGURE 5 is another perspective view in a different partial section of the same upper cylindrical block.

Central point 97 can be better seen in another partial section of block 49 shown in FIGURE 5. Inclined passages 102, 103, and 104 communicate between central point 97 and the lower face 96 of block 49. The lower ends of passages 102, 103, and 104, terminate adjacent to flexible diaphragm 51 and above pistons 75, 77, and 73, respectively. The lower end of threaded, vertical passage 89 is seen as terminating adjacent depression 84 in diaphragm 51, and above piston 75.

Figure 6:
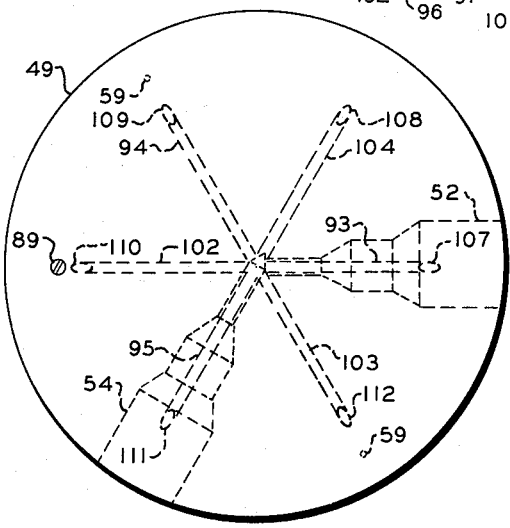
FIGURE 6 is a top elevational view of the upper cylindrical block of this valve.

In FIGURE 6 is shown a top elevational view of upper block 49 indicating the relative positions of horizontal passages 52 and 54, inclined passages 93 to 95, and 102 to 104. The lower terminals of these inclined passages, 107 to 112, are arranged in spaced relation so as to terminate adjacent to the upper ends of pistons 72 to 77, respectively.

Figure 7:
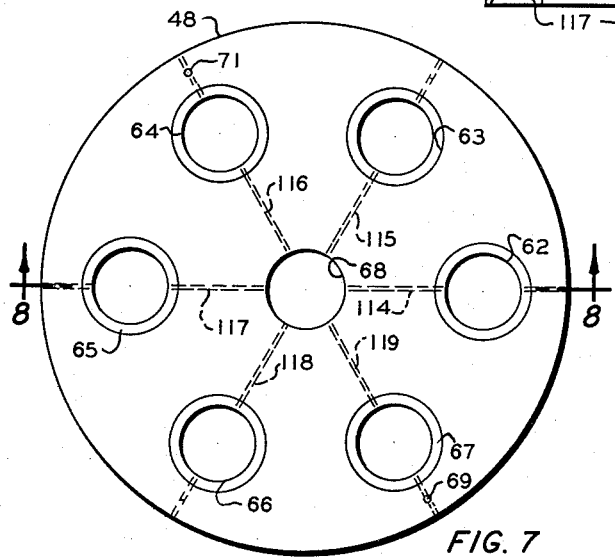
FIGURE 7 is a top elevational view of the middle cylindrical block of this valve with pistons removed.

Referring now to FIGURE 7, middle block 48 is shown in top elevational view. It is provided with six channels, 114 to 119, which are located on the six radii diverging from the center of central passage 68 and bisecting chambers 62 to 67. Each of these chambers is provided with a counter bore in the upper surface of middle block 48 which is intended to permit the adjacent portions of flexible diaphragm 51 to seat completely when under power gas pressure over the upper ends of pistons 72 to 77.

Figure 8:
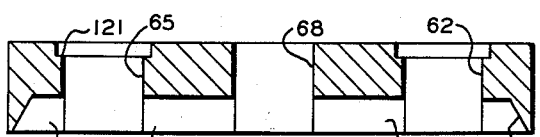
FIGURE 8 is a sectional view taken along line 8—8 of FIGURE 7.

In FIGURE 8 is shown a cross-sectional view of block 48. The counter bores, such as 121 in chamber 65, can be more readily seen. Also, it will be noted that channels 114 and 117 have a slot-like configuration.

Figure 9:
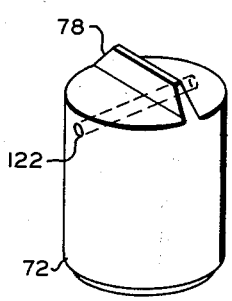
FIGURE 9 is a perspective view of one of the pistons of this valve.

Referring now to FIGURE 9, a typical piston 72 is shown. Piston 72 is provided with lug 78, and a horizontal passage 122 through the body thereof near the lug end. Passage 122 is right-angularly disposed to lug 78 and is adapted to receive therethrough a wire (not shown) which retains piston 72 aligned so that when lug 78 thereof contacts toroidal ring 61, the axis of lug 78 is parallel to the adjacent portion of ring 61, providing a greater area of sealing contact within channel 56.

Figure 10:
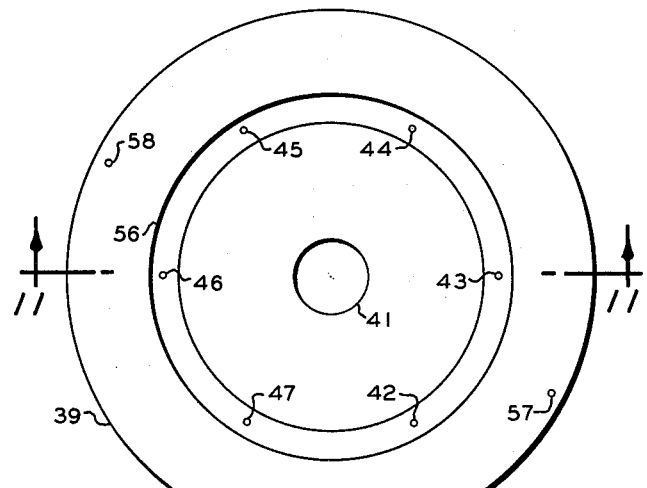
FIGURE 10 is a top elevational view of the bottom cylindrical block of this valve.

In FIGURE 10, lower block 39 is shown in top elevational view. The upper terminals of passages 42 to 47 can be seen as equi-spaced within channel 56, and arranged so that the pistons 72 to 77 within block 48 will seat midway between the upper ends adjacent pairs of said passages 42 to 47.

Figure 11:
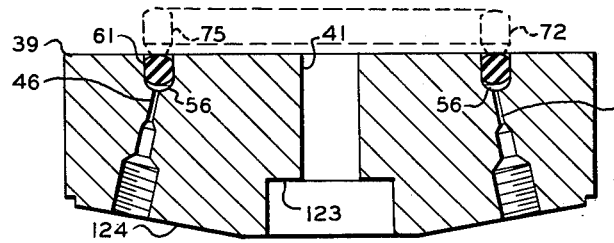
FIGURE 11 is a sectional view taken along line 11—11 of FIGURE 10.

Referring now to FIGURE 11, lower block 39 is shown in elevational view in full section. Central vertical passage 41 is provided with a counter bore 123 in its lower end to receive said Allen screw. The lower face, 24 of block 39 is sloped downwardly to the center thereof, giving the passages, such as 43 and 46, which are perpendicular to said slope face, an inclined disposition. Passages 43 and 46 terminate in the bottom of annular channel 56. Pistons 72 and 75 are indicated in the up position.

Figure 12:
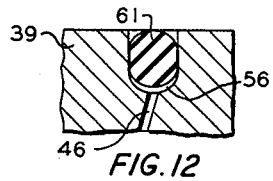
FIGURE 12 is an enlarged view of a section of FIGURE 11.

FIGURE 12 shows an enlarged portion of part of FIGURE 11 and indicates the frictional engagement of the toroidal ring 61 with the sides of annular channel 56.

Figure 13:
FIGURE 13 is an elevational view in full section of a toroidal ring useful in this invention.

FIGURE 13 shows the toroidal ring of FIGURE 11 removed from annular channel 56 and in its uncompressed state.

Figure 14:
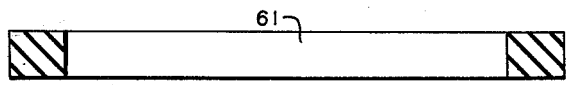
FIGURE 14 is an elevational view in full section of another ring that can be employed in this invention.

FIGURE 14 shows another type of toroidal ring, rectangular in cross section, which can be employed in the sampling valve of this invention.

Figure 15:
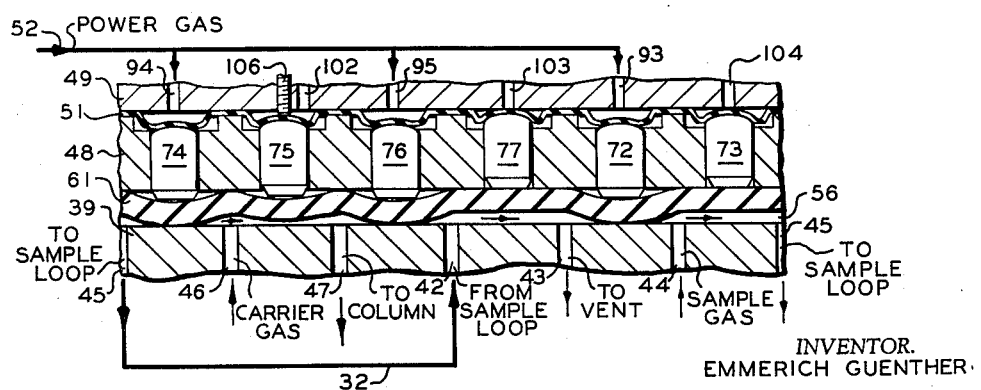
FIGURE 15 is a longitudinally-extended full section of the central portion of the assembled valve of FIGURE 2 shown in one position of operation.

In operation, when power gas flows to sampling valve 22 from pilot valve 21 via conduit 23, the flow path of carrier gas and sample gas through sampling valve 22 is shown in FIGURE 15, which is a longitudinally-extended full section of the central portion of sampling valve 22. Carrier gas in conduit 27, under greater than atmospheric pressure, enters passage 46 in lower body 39 of sampling valve 22, passing upwardly into the bottom of annular channel 56. The gas will then travel within channel 56, under flexible ring 61, either toward passage 45 or passage 47, depending upon which side of inlet passage 46 that ring 61 has sealed off.

Simultaneously, in one position of operation, power gas from pilot valve 21 enters sampling valve 22 through conduit 23, threaded passage 52, upper block 49, and then to the upper surface of flexible diaphragm 51, via inclined passages 93, 94, and 95. Diaphragm 51 is expanded by the power gas pressure, forcing pistons 74, 76, and 72, within middle block 48, downwardly against flexible ring 61 within annular channel 56 of lower block 39. The passages between adjacent passages 45 and 46; 47 and 42; and 43 and 44, are thereby closed by ring 61 sealing against the bottom of channel 56 at the indicated points.

Figure 16:
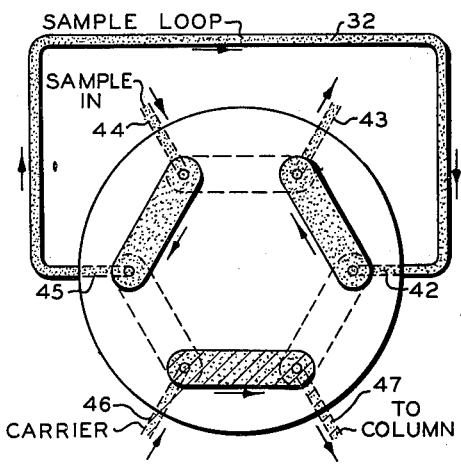
FIGURE 16 is a schematic view showing the paths of flow of the system gases through the valve passages corresponding to the valve position shown in FIGURE 15.
Figure 17:
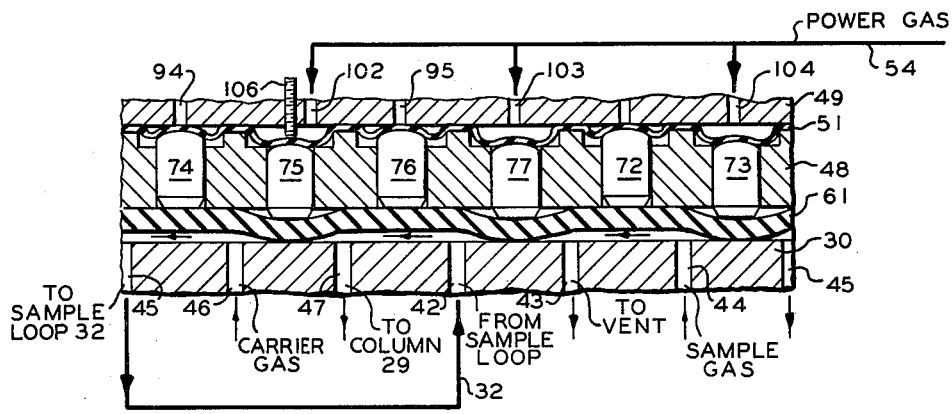
FIGURE 17 is another longitudinally-extended full section of the central portion of the valve of this invention indicating the alternate position of operation.

Thus, when power gas flows through conduit 23 to sampling valve 22, carrier gas from passage 46 flows through the passageway underneath toroidal ring 61 to passage 47, and out of valve 22 to sorption column 29, via conduit 28. Concurrently, sample gas from sample source conduit 31, under greater than atmospheric pressure, and above the power gas pressure as well, enters sampling valve 22 through passage 44, passes under ring 61 to passage 45, and out of valve 22 to sample loop 32. The sample gas in sample loop 32 re-enters valve 22 via conduit 42, flows under ring 61 to outlet passage 43, and thence to vent via conduit 33. FIGURE 16 shows diagrammatically the paths of flow of carrier and sample gas through sample valve 22, as described above.

Figure 18:
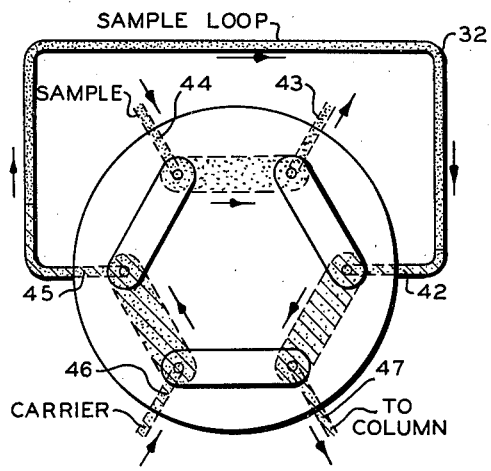
FIGURE 18 is another schematic view showing the alternate paths of flow of the system gases through the valve and corresponding to the valve position shown in FIGURE 17.

When pilot valve 21 switches to its alternate position, as directed by programmer 38, power gas from pilot valve 21 now passes through conduit 24 to sampling valve 22, enters via passage 54 to central chamber 97 and thence via inclined passages 102, 103, and 104, to the upper side of flexible diaphragm 51. The areas of diaphragm 51, adjacent to pistons 75, 77, and 73 are distended downwardly due to the power gas pressure, forcing the said pistons to make contact with and seal ring 61 against the bottom of annular channel 56 at their respective locations. Carrier gas from conduit 27 still enters valve 22 via passage 46, but now passes under ring 61 over to passage 45, and thence to sample loop 32, driving the trapped sample slug therein before it. The carrier gas, with the sample slug ahead of it, re-enters sampling valve 22 through passage 42. The stream now flows over to outlet passage 47, and out of valve 22 to sorption column 29 for separation of the constituents in the sample slug in said column. Simultaneously, sample gas is still entering valve 22 through passage 44 passing to passage 43 and out to vent via conduit 33. FIGURE 18 shows diagrammatically, the paths of flow of carrier and sample gas through sampling valve 22 in the alternate position of operation.

When pilot valve 21 once more switches back to the original position, the two sets of three pistons will reverse their position to that described in connection with FIGURE 15. Thus, the paths of flow of the gases will return to that shown in FIGURE 16, until it is desired to pass another sample slug to sorption column 29. The frequency with which the sample slug is passed to column 29 is determined by the operation of pilot valve 21, controlled through programmer 38.

Although the valve is described as applied to a chromatographic analyzer system, it is not limited thereto, but it can be employed in any situation where fluid-actuated toroidal ring seal valve is indicated. Reasonable variations and modifications are possible within the scope of this disclosure without departing from the spirit and scope of the invention.

I claim:
1. A fluid-actuated motor valve system for distributing a first fluid comprising, in combination, a lower body having two opposite faces, first, second, third and fourth spaced conduits in said lower body communicating between said faces, an annular channel of generally rectangular cross section in the first of said faces and adjacent to the upper ends of said conduits, a resilient torodial ring member of generally rectangular cross section seated securely in said channel and enclosing a passage thereunder, a middle body adjacent to said lower body and provided with four vertical spaced chambers therethrough, the centers of said chambers being adjacent to the four points in said annular channel which are midway between each pair of said upper ends of said conduits, the lower face of said middle body provided with four channels located on the radii diverging from the center thereof and bisecting said chambers, a piston disposed within each of said chambers and provided with a diametrically aligned lug on the lower end thereof which is adjacent said ring, each of said pistons further provided with a single passage through the body thereof near the lug end and right-angularly disposed to said lug for receiving therethrough a wire which retains said piston in a position so that said lug contacts said ring in a longitudinal direction, said wires being disposed in said four channels in said first face of said middle body, a flexible diaphragm disposed adjacent to the upper face of said middle body, first means connected to supply said first fluid to be distributed under a first pressure to said second conduit, a second means connected to receive said first fluid from said first conduit, a sample conduit communicating between said third and fourth conduits and to receive said first fluid; a third means connected to supply during a first interval of time a second fluid under a second pressure lesser than said first pressure to first and third areas above said flexible diaphragm adjacent to the upper ends of the first and third of said pistons, said second pressure being thereby transmitted to portions of said ring adjacent to said lugs on said first and third pistons thereby sealing the passages in said annular channel between first and third adjacent pairs of said conduits, a fourth means connected to supply during a second interval of time said second fluid under said second pressure to second and fourth areas above said flexible diaphragm adjacent to the upper ends of the second and fourth of said pistons, said second pressure being thereby transmitted to other portions of said ring adjacent to said lugs on said second and fourth pistons thereby sealing the passages in said annular channel between said second and fourth adjacent pairs of said conduits, and said resilient ring adapted to return to its normal undistended position within said annular channel when said piston lugs are released from contact therewith.

2. A fluid-actuated motor valve system for distributing a first fluid to a selected conduit comprising, in combination, a body having two opposite faces, at least a first, second, and third spaced conduits in said body communicating between said faces, a channel in the first of said faces and adjacent to the upper ends of said spaced conduits, a resilient ring member frictionally engaging the sides of said channel and enclosing a passage thereunder, a first pressure actuated biasing means disposed between said first and second conduits and a second pressure actuated biasing means disposed between said second and third conduits, both biasing means being adjacent to said ring member and external to said channel, support means for said pressure actuated biasing means disposed to hold the latter in a vertical axially movable relation, a first means connected to supply said first fluid to be distributed under a first pressure to said second conduit, a second means connected to receive said first fluid from said first conduit, a third means connected to receive said first fluid from said third conduit, a fourth means connected to supply during a first interval of time a second fluid under a second pressure lesser than said first pressure to the upper end of said first pressure actuated biasing means, said second pressure being thereby transmitted to a first portion of said ring member between said first and second conduits thereby distending said ring member to seal the passage in said channel therebetween, a fourth conduit means connected to supply during a second interval of time said second fluid under said second pressure to the upper end of said second pressure actuated biasing means, said second pressure being thereby transmitted to a second portion of said ring member between said second and third conduits thereby distending said ring member to seal the passage in said channel therebetween and said resilient ring member adapted to return under the pressure of said first fluid to its original undistended position within said channel when said pressure actuated biasing means are released from contact therewith, thereby permitting re-establishing of fluid communication between the adjacent conduits.

3. A fluid-actuated motor valve system for distributing a first fluid to a selected conduit comprising, in combination a body having two opposite faces, at least first, second and third, spaced conduits in said body communicating between said faces, a channel in the first of said faces and adjacent to the upper ends of said spaced conduits, a resilient ring member frictionally engaging the sides of said channel and enclosing a passage thereunder, a first piston means disposed between said first and second conduits and a second piston means disposed between said second and third conduits, both piston means being adjacent to said ring member and external to said channel, support means for said piston means disposed to hold the latter in a vertical axially movable relation, a first means connected to supply said first fluid to be distributed under a first pressure to said second conduit, a second means connected to receive said first fluid from said first conduit, a third means connected to receive said first fluid from said third conduit, a fourth means connected to supply during a first interval of time a second fluid under a second pressure lesser than said first pressure to the upper end of said first piston, said second pressure being thereby transmitted to a first portion of said ring member between said first and second conduits thereby distending said ring members to seal the passage in said channel therebetween, a fourth conduit means connected to supply during a second interval of time said second fluid under said second pressure to the upper end of said second piston, said second pressure being thereby transmitted to a second portion of said ring member between said second and third conduits thereby distending said ring member to seal the passage in said channel therebetween, and said resilient ring member adapted to return under pressure of said first fluid to its original undistended position within said channel when said piston means are released from contact therewith, thereby permitting re-establishing of fluid communication between the adjacent conduits.

4. A fluid-actuated motor valve system for distributing a first fluid to a selected conduit comprising, in combination, a body having two opposite faces, at least first, second and third, spaced conduits in said body communicating between said faces, an annular channel in the first of said faces and adjacent to the upper ends of said spaced conduits, a resilient ring member frictionally engaging the sides of said channel and enclosing a passage thereunder, a first piston means disposed between said first and second conduits and a second piston means disposed between said second and third conduits, both piston means being adjacent to said ring member and external to said annular channel, support means for said piston means disposed to hold the latter in a vertical axially movable relation, a first means connected to supply said first fluid to be distributed under a first pressure to said second conduit, a second means connected to receive said first fluid from said first conduit, a third means connected to receive said first fluid from said third conduit, a fourth means connected to supply during a first interval of time a second fluid under a second pressure lesser than said first pressure to the upper end of said first piston, said second pressure being thereby transmitted to a first portion of said ring member between said first and second conduits thereby distending said ring member to seal the passage in said annular channel therebetween, a fourth conduit means connected to supply during a second interval of time said second fluid under said second pressure to the upper end of said second piston, said second pressure being thereby transmitted to a second portion of said ring member between said second and third conduits thereby distending said ring member to seal the passage in said annular channel therebetween, and said resilient ring member adapted to return under pressure of said first fluid to its original undistended position within said annular channel when said piston means are released from contact therewith, thereby permitting re-establishing of fluid communication between the adjacent conduits.

5. A fluid-actuated motor valve system for distributing a first fluid to a selected conduit comprising, in combination, a body having two opposite faces, at least first, second, and third spaced conduits in said body communicating between said faces, an annular channel in the first of said faces and adjacent to the upper ends of said spaced conduits, a resilient linear member frictionally engaging the sides of said channel and enclosing a passage thereunder, a first piston means disposed between said first and second conduits and a second piston means disposed between said second and third conduits, both piston means being adjacent to said linear member and external to said channel, support means for said piston means disposed to hold the latter in a vertical axially movable relation, a first means connected to supply said first fluid to be distributed under a first pressure to said second conduit, a second means connected to receive said first fluid from said first conduit, a third means connected to receive said first fluid from said third conduit, a fourth means connected to supply during a first interval of time a second fluid under a second pressure lesser than said first pressure to the upper end of said first piston, said second pressure being thereby transmitted to a first portion of said linear member between said first and second conduits thereby distending said linear member to seal the passage in said annular channel therebetween, a fourth conduit means connected to supply during a second interval of time said second fluid under said second pressure to the upper end of said second piston, said second pressure being thereby transmitted to a second portion of said linear member between said second and third conduits thereby distending said linear member to seal the passage in said annular channel therebetween, and said resilient linear member adapted to return under pressure of said first fluid to its original undistended position within said annular channel when said piston means are released from contact therewith, thereby permitting re-establishing of fluid communication between the adjacent conduits.

6. A fluid-actuated motor valve system for collecting one of a first fluid and a second fluid from one of their respective conduits comprising, in combination, a body having two opposite faces, at least first, second and third spaced conduits in said body communicating between said faces, a channel in the first of said faces and adjacent to the upper ends of said spaced conduits, a resilient linear member frictionally engaging the sides of said channel and enclosing a passage thereunder, a first pressure actuated biasing means disposed between said first and second conduits and a second pressure actuated biasing means disposed between said second and third conduits, biasing means being both adjacent to said linear member and external to said channel, support means for said pressure actuated biasing means disposed to hold the latter in a vertical axially movable relation, a first means connected to supply said first fluid to be collected under a first pressure to said first conduit, a second means connected to supply said second fluid under a second pressure to said third conduit, a third means connected to receive fluid from said second conduit, a fourth means connected to supply during a first interval of time a third fluid under a third pressure lesser than said first pressure to the upper end of said first pressure actuated biasing means, said third pressure being thereby transmitted to a first portion of said linear member between said first and second conduits thereby distending said linear member to seal the passage in said channel therebetween, a fifth means connected to supply during a second interval of time said third fluid under said third pressure also lesser than said second pressure to the upper end of said second pressure actuated biasing means, said third pressure being thereby transmitted to a second portion of said linear member between said second and third conduits thereby distending said linear member to seal the passage in said channel therebetween and said resilient linear member adapted to return under pressure of said first and second fluids to its original undistended position within said channel when said pressure actuated biasing means are released from contact therewith, thereby permitting re-establishing of fluid communication between the adjacent conduits.

7. The combination according to claim 6 wherein said channel is annular in shape.

8. The combination according to claim 6 wherein said resilient member is ring-shaped.

9. The combination according to claim 6 wherein said pressure-actuated biasing means are pistons.

10. The combination according to claim 6 wherein said resilient member is toroidal in cross section.

11. A two-position, fluid-actuated, valve comprising, in combination, a lower first block having a first central passage therein adapted to receive therethrough the shaft of a threaded fastening screw, said lower block having two opposite faces, a plurality of spaced conduits in said lower block communicating between said faces, said conduits at the lower ends thereof being threadedly adapted to receive a plurality of connecting nuts, each of said nuts adapted to receive tubing at the external end thereof, a channel in said upper face of said lower block disposed adjacent to the upper ends of said conduits, said lower block provided with two perforations to receive therein first and second pins respectively, a resilient toroidal member frictionally engaging the sides of said channel and enclosing a passage thereunder, a middle second block adjacent to said lower first block and provided with a set of six vertical spaced chambers therethrough and having two perforations therein disposed so that when mounted on said first and second pins the centers of said chambers are adjacent to the plurality of points in said channel which are midway between each pair of said adjacent conduits and a central passage for receiving therethrough the shaft of said fastening screw, the lower face of said middle block being provided with a plurality of channels located on the radii diverging from the center thereof and bisecting said chambers, a piston disposed within each of said chambers, each of said pistons provided with a diametrically aligned lug on the lower end thereof which is adjacent said toroidal member, each of said pistons further provided with a single passage through the body thereof near the lug end and right-angularly disposed to said lug for receiving therethrough a wire which retains said piston in a position so that said lug contacts said toroidal member in a longitudinal direction, said wires being disposed in the said channels in said middle block, a thin flexible diaphragm disposed adjacent to the upper face of said middle block, an upper third block having a central threaded first chamber in the lower face thereof adapted to receive therein the threaded end of said fastening screw, said first and second spaced pins affixed to said lower horizontal face of said upper block, said upper block having a first threaded passage therein extending between a region exterior of said block and a first central point on the center line thereof, first, second, and third inclined passages communicating between said first central point on said center line and said lower horizontal face, the ends of said inclined passages being adjacent said flexible diaphragm at points above the first, third and fifth of said pistons, a second threaded passage extending between the region exterior of said upper block and a second central point on said center line thereof, fourth, fifth, and sixth, inclined passages communicating between said second central point in said upper block and said lower horizontal face, the ends of said latter inclined passages being adjacent said flexible diaphragm at points above said second, fourth and sixth pistons, a connecting nut threadedly mounted in the external end of said first threaded passage and adapted to receive a tubing from an external power gas source and another connecting nut threadedly mounted in the external end of said second threaded passage and adapted to receive another tubing from said external power gas source.

12. A two-position, fluid-actuated, toroidal-ring valve comprising, in combination, a lower first block having a first central passage therein adapted to receive therethrough a threaded fastening screw, said lower block having two opposite faces, a first, second, third, fourth, fifth and sixth spaced conduits in said lower block communicating between said faces and inclined to the upper horizontal one of said faces, said conduits at the lower ends thereof being threadedly adapted to receive six connecting nuts, said six connecting nuts adapted to receive tubing at the external ends thereof, an annular channel of generally rectangular cross section in said upper face of said lower block, said channel disposed adjacent to the upper ends of said six conduits, said lower block provided with two perforations near the periphery thereof to receive therein first and second pins respectively, a resilient toroidal-ring of generally rectangular cross section adapted to frictionally engage the sides of said annular channel and enclose a passage thereunder, a middle second block adjacent to said lower first block and provided with six vertical spaced chambers therethrough and having two perforations therein near the periphery of said second block disposed so that when mounted on said first and second pins the centers of said chambers are adjacent to the six points in said annular channel which are midway between each pair of said six conduits and a central passage for receiving therethrough said fastening screw, the lower face of said middle block being provided with six channels located on the radii diverging from the center thereof and bisecting said chambers, each of said chambers being provided with a counter bore in the upper face of said middle block, a piston disposed within each of said six chambers in said middle block, each of said pistons provided with a diametrically aligned lug on the lower end thereof which is adjacent said toroidal ring, each of said pistons further provided with a single passage through the body thereof near the lug end and right-angularly disposed to said lug for receiving therethrough a wire which retains said piston in a position so that said lug contacts said toroidal ring in a longitudinal direction, said wires being disposed in the said six channels in said middle block, a thin flexible diaphragm disposed adjacent to the upper face of said middle block, an upper third block having a central threaded first chamber in the lower horizontal face thereof adapted to receive therein the threaded end of said fastening screw, said first and second spaced pins affixed to said lower horizontal face of said upper block and near the periphery thereof, said upper block having a first threaded passage therein extending between a region exterior of said block and a first central point on the center line thereof, first, second, and third inclined passages communicating between said first central point on said center line and said lower horizontal face of said upper block, the ends of said inclined passages being adjacent said flexible diaphragm at points above the first, third, and fifth of said pistons, a second threaded passage extending between the region exterior of said upper block and a second central point on said center line thereof, fourth, fifth, and sixth inclined passages communicating between said second central point in said upper block and said lower horizontal face, the ends of said latter inclined passages being adjacent said flexible diaphragm at points above said second, fourth, and sixth pistons, a seventh connecting nut threadedly mounted in the external end of said first threaded passage and adapted to receive a seventh tubing from an external power gas source, and an eighth connecting nut threadedly mounted in the external end of said second threaded passage and adapted to receive an eighth tubing from said power gas source.

References Cited in the file of this patent

UNITED STATES PATENTS

| | | |
|---|---|---|
| 766,420 | Calley | Aug. 2, 1904 |
| 2,331,291 | Annin | Oct. 12, 1943 |
| 2,575,240 | Thompson | Nov. 13, 1951 |
| 2,802,484 | Sheets | Aug. 13, 1957 |